(12) United States Patent
Bichot et al.

(10) Patent No.: US 9,313,531 B2
(45) Date of Patent: Apr. 12, 2016

(54) DEVICE AND METHOD FOR CONTENT DELIVERY ADAPTED FOR SYNCHRONOUS PLAYBACKS

(75) Inventors: Guillaume Bichot, Cesson-Sévigné (FR); Yvon Legallais, Cesson-Sévigné (FR); Christopher Howson, Cesson-Sévigné (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/200,843

(22) Filed: Oct. 4, 2011

(65) Prior Publication Data

US 2014/0095652 A1 Apr. 3, 2014

(30) Foreign Application Priority Data

Oct. 6, 2010 (EP) .................................... 10290536
Dec. 1, 2010 (EP) .................................... 10306335

(51) Int. Cl.
*G06F 15/16* (2006.01)
*H04N 21/242* (2011.01)
*H04N 21/8547* (2011.01)

(52) U.S. Cl.
CPC ......... *H04N 21/242* (2013.01); *H04N 21/8547* (2013.01)

(58) Field of Classification Search
USPC ................................................ 709/221, 231
See application file for complete search history.

(56) References Cited

U.S. PATENT DOCUMENTS

| | | | |
|---|---|---|---|
| 5,446,490 A | 8/1995 | Blahut et al. | |
| 5,852,609 A | 12/1998 | Adams et al. | |
| 6,630,963 B1 | 10/2003 | Billmaier | |
| 7,805,373 B1 * | 9/2010 | Issa et al. | G06Q 30/0241 705/14.4 |
| 2004/0040042 A1 * | 2/2004 | Feinleib | G06F 17/30017 725/112 |
| 2006/0002681 A1 * | 1/2006 | Spilo et al. | H04N 5/76 386/220 |

(Continued)

FOREIGN PATENT DOCUMENTS

| | | |
|---|---|---|
| CN | 101282230 | 10/2008 |
| EP | 887974 | 12/1998 |

(Continued)

OTHER PUBLICATIONS

European Search Report dated Feb. 11, 2011.

(Continued)

*Primary Examiner* — Vivek Srivastava
*Assistant Examiner* — Hermon Asres
(74) *Attorney, Agent, or Firm* — Jack Schwartz & Associates, PLLC

(57) ABSTRACT

A method for delivering content to at least two terminals for synchronous playback is described. The method includes providing a first association of content to a preamble sequence, providing a second association of content to an ending sequence, providing estimations of data delivery duration from a server to at least two terminals and a playback duration of the preamble sequence in at least one of the first and second association, delivering the first and second association to the terminals wherein the playback duration of the preamble sequence is greater than or equal to the largest difference between the estimations, and wherein the estimations of data delivery duration allows each of the at least two terminals to evaluate a local temporization duration for playing-back synchronous content.

13 Claims, 5 Drawing Sheets

(56) References Cited

U.S. PATENT DOCUMENTS

| | | |
|---|---|---|
| 2006/0156375 A1 | 7/2006 | Konetski |
| 2009/0251599 A1 | 10/2009 | Kashyap et al. |
| 2010/0303100 A1* | 12/2010 | Niamut et al. .......... H04L 65/80 370/503 |

FOREIGN PATENT DOCUMENTS

| | | |
|---|---|---|
| EP | 1003313 | 5/2000 |
| EP | 2141689 | 1/2010 |
| EP | 2164222 | 3/2010 |
| GB | 2457253 | 8/2009 |
| WO | WO9628908 | 9/1996 |
| WO | WO02071760 | 9/2002 |
| WO | WO2006006026 | 1/2006 |
| WO | WO2009051693 | 4/2009 |
| WO | WO2010047514 | 4/2010 |
| WO | WO2010047787 | 4/2010 |

OTHER PUBLICATIONS

Van Deventer et al.:"Advanced Interactive Television Services Require Content Synchronization." Systems Signals and Image Processing2008. IWSSIP 2008, 15th Internationai Conference Jun. 25-28, 2008.

Rauschenbach, "A scalable interactive TV service supporting synchronized delivery over broadcast and broadband networks", The Savant Project, www.savant.tv, Dec. 2, 2002, pp. 1-17.

* cited by examiner

Non-interactive playback operation at terminals T1, T2, T3, T4

Interactive playback operation at terminals T1, T2, T3, T4

DEVICE AND METHOD FOR CONTENT DELIVERY ADAPTED FOR SYNCHRONOUS PLAYBACKS

This application claims the benefit, under 35 U.S.C. §119 of EP Patent Application 10290536.1, filed 6 Oct. 2010 and EP Patent Application 10306335.0, filed 1 Dec. 2010.

FIELD OF THE INVENTION

The invention relates to the field of content delivery adapted for synchronous content playback by terminals connected to a server delivering simultaneously said content to said terminals via networks having different data delivery duration generating different delivery delays.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Nowadays, regarding broadcast TV, a broadcaster such as TF1 or M6 in France is not attached to a single broadcast feed. The broadcaster can distribute its live programs simultaneously through several pipes such as Internet Protocol Television (IPTV), or Digital Terrestrial Television (DTT or DDTV), satellite, and even over the worldwide web. One problem is that all these pipes use different network technologies generating very different delivery delays. This may result in a strange user experience such as when a TV spectator is watching a soccer match delivered over his broadband IPTV service and he may hear a joyous explosion from his neighbourhood, reacting to a goal if for example a said neighbourhood is probably watching the same program but delivered through the DTT network. Said TV spectator will see the goal too but it may happen several seconds afterwards. More annoying is the case of interactive programs (e.g. a quiz show) where the competitors (TV spectators located in different homes) are not equally treated depending on their TV feed. Overall the delay difference among all the TV delivery networks is typically several seconds. The broadcaster doesn't wish to handle a complex delivery taking into account the different delivery delays of various used pipes.

A classical delivery system is represented in FIG. 1. It comprises four terminals T1, T2, T3, T4 and a server S connected through four various networks N1, N2, N3, N4 such as for example: Satellite, Cable, digital terrestrial TV, broadband IPTV, on demand, Internet etc. . . . Four Head-ends devices VHE1, VHE2, VHE3, VHE4 are adapted for formatting the content as proposed by the broadcaster (not represented on FIG. 1) for being delivered to said terminals for quasi-simultaneous playbacks. As explained above, there can be delays of about 10 second between the playbacks on standard/basic terminals.

When terminals are not especially adapted for simultaneous playbacks, one will speak of "basic terminals". Said basic terminals start playing back the delivered content as soon as said content reaches the terminal. But the data delivery durations on the various links, from said server S to said terminals, are not necessarily identical. This variability of data delivery durations introduces delays (up to 10 seconds) between the playbacks performed by all the terminals. This may be problematic when synchronization among terminal users is a strong requirement such as for interactive programs (e.g. TV quiz show wherein terminal users are invited to answer questions in live) or for live events such as a soccer match.

This problem is known and solved by van Deventer et al. in "Advanced Interactive Television Services Require Content Synchronization" appearing in Systems, Signals and Image Processing, 2008. IWSSIP 2008. 15th International Conference, 25-28 Jun. 2008. Van Deventer et al. propose to handle delivery duration variability with synchronization buffers located either in network or at terminals. The proposed solution is not fully described and is silent on the way the modified basic terminal could implement said feature and particularly it is silent on the complexity of the operation for the broadcaster in terms of supplying of synchronisation signals and especially on the problems of deployment of such solution in a world where most of terminals are basic terminals.

One of the goals of the present invention is to propose a solution for synchronizing the rendering of a program delivered simultaneously over different networks which would be simple to manage by the broadcaster in charge of supplying content to various terminals via various networks and last but not least which would be compliant with existing "basic terminals".

SUMMARY OF THE INVENTION

Thus, the present invention concerns according to a first aspect a method for delivering a content CNT to at least two terminals T1, T2, T3, T4 for synchronous playback of said content CNT onto said at least two terminals T1, T2, T3, T4, each of at least two terminals T1, T2, T3, T4 being connected over a server S through at least one network N1, N2, N3, N4.

According to an embodiment, at said server S, it involves steps of:

associating ST10 into a first association A1 said content CNT to said preamble sequence PS, said preamble sequence PS being temporally positioned in said first association A1 such that a terminal T1, T2, T3, T4 playing back said first association A1 plays-back successively and continuously said preamble sequence PS and said content CNT;

associating ST11 into a second association A2 said content CNT to an ending sequence ES, said ending sequence PS and being temporally positioned in said second association A2 such that a terminal T1, T2, T3, T4 playing back T1, T2, T3, T4 said second association A2 plays-back successively and continuously said content CNT and said ending sequence ES;

Inserting ST100 estimations DDE1, DDE2, DDE3, DDE4 of data delivery duration from said server S to each of the at least two terminals T1, T2, T3, T4 via said at least one network N1, N2, N3, N4, and a playback duration of said preamble sequence PS in at least one of said first and second association A1, A2.

delivering ST1000 said first association A1 and second association A2 to said terminals T1, T2, T3, T4 via said at least one network N1, N2, N3, N4.

Advantageously, it involves, prior to said steps of associating ST10, ST11, a step of evaluating ST1 the playback duration of the preamble sequence PS, wherein said playback duration is greater than or equal to the largest difference between said estimations DDE1, DDE2, DDE3, DDE4, said preamble sequence PS is adapted for being played back by said terminals T1, T2, T3, T4.

Advantageously, said preamble sequence PS and said ending sequence ES have an identical playback duration.

Advantageously, said preamble sequence PS, said ending sequence ES and said content CNT are audio programs or programs combining audio and video.

The present invention concerns according to a second aspect a method for playing-back synchronously a content CNT by a terminal T1, T2, T3, T4 connected over at least one network N1, N2, N3, N4 to a server S delivering said content CNT, said terminal T1, T2, T3, T4 receiving through said network N1, N2, N3, N4 a first association A1 and a second association A2, said first association A1 gathering a preamble sequence PS and said content CNT, said preamble sequence PS being temporally positioned in said first association A1 such that when said terminal T1, T2, T3, T4 plays back said first association A1, it plays-back successively and continuously said preamble sequence PS and said content CNT, said second association A2 gathering said content CNT and an ending sequence ES, said ending sequence ES being temporally positioned in said second association A2 such that when said terminal T1, T2, T3, T4 plays back said second association A2, it plays-back successively and continuously said content CNT and said ending sequence ES, one of said first or second association A1, A2 further comprising estimations DDE1, DDE2, DDE3, DDE4 of data delivery duration from said server S to each of the at least two terminals T1, T2, T3, T4 via said networks N1, N2, N3, N4

According to an embodiment, at said terminal T3, it involves the steps of:

Receiving SR1 said first and second association A1, A2 via said network N3;

Extracting SR10 a preamble sequence PS playback duration and said estimations DDE1, DDE2, DDE3, DDE4 from said one of said first or second association A1, A2;

Identifying SR100 the network N3 through which said terminal T3 is receiving said second association A2;

Evaluating SR1000 a local temporization duration LTD3 from the largest estimation DDE1 and the estimation DDE3 corresponding to said identified network N3;

Playing-back SR10000 an introductory temporization program P3 corresponding to a starting part of the preamble sequence PS received via said first association A1, said step of playing-back starts at the reception date of said second association A2 and lasts a time period equal to said local temporization duration LTD3;

Playing-back SR10001 successively and continuously said second association A2.

Advantageously, said step of extracting SR10 further consists in extracting from said one of said first or second association A1, A2 an arbitrary duration value τ, wherein said step of evaluating SR1000 of local temporization duration LTD3 consists in assigning to the local temporization duration LTD3 a value equal to the sum of said arbitrary value τ with a difference between the largest estimation DDE1 and the estimation DDE3.

Advantageously, said step of playing back SR10001 said second association A2 ends at the end of a time period whose duration is equal to the content CNT playback duration plus the preamble sequence PS playback duration minus said local temporization duration LTD3.

The present invention concerns according to a third aspect a terminal T3 for playing back a content CNT.

According to an embodiment, said terminal receives said content CNT from a server S through a first association A1 and a second association A2 through at least one network N3, said first association A1 gathering a preamble sequence PS and said content CNT both adapted for being played-back by said terminal T3, said preamble sequence PS being temporally positioned in said first association A1 such that said terminal T3 plays back successively and continuously said preamble sequence PS and said content CNT, said second association A2 gathering said content CNT and an ending sequence ES adapted for being played-back, said ending sequence ES being temporally positioned in said second association A2 such that said terminal T3 plays-back successively and continuously said content CNT and said ending sequence ES, and one of said first or second association A1, A2 further comprises estimations DDE1, DDE2, DDE3, DDE4 of data delivery duration from said server S to terminals T1, T2, T3, T4 via networks N1, N2, N3, N4 and a preamble sequence PS playback duration.

Advantageously, the terminal T3 comprises:

Means for receiving said first and second association A1, A2 via said network N3;

Means for extracting the preamble sequence PS playback duration and said estimations DDE1, DDE2, DDE3, DDE4 from said one of said first or second association A1, A2;

Means for identifying the network N3 through which said terminal T3 is receiving said second association A2;

Means for evaluating a local temporization duration LTD3 from the largest estimation DDE1 and the estimation DDE3 corresponding to said identified network N3;

Means for playing-back an introductory temporization program P3 from a starting reception date of said second association A2 during the local temporization duration LTD3;

Means for playing-back successively and continuously said second association A2.

Advantageously, the terminal T3 is configured for operating according to a first mode of operation in which it plays back the first association A1 as soon as it receives said first association A1.

Advantageously, the terminal T3 is configured for operating according to a second mode of operation in which, as soon as it receives said first and second association A1, A2 it plays back the preamble sequence PS during a duration equal to said local temporization duration LTD3 and successively and continuously the second association A2, wherein said local temporization duration LTD3 is a difference between the largest estimation DDE1 and the estimation DDE3 corresponding to said identified network N3.

Advantageously, the terminal T3 interrupts playing back said second association A2 at a date corresponding to said starting reception date plus the content CNT playback duration plus the preamble sequence PS playback duration minus said local temporization duration LTD3.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiments and execution examples, in no way limitative, with reference to the appended figures on which:

FIG. 2a represents a structure of data according to an embodiment comprising a first association and a second association, both associations being composed at the server S before a simultaneous delivery to terminals T1, T2, T3, T4 over the networks;

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

An embodiment is described, which corresponds to a situation where a broadcaster prepares and delivers a content CNT located on a server S such that whatever the network N1, N2, N3, N4 used for delivery said content CNT can reach terminals adapted for playing back essentially simultaneously said content CNT and/or basic terminals. This also applies to terminals which can select the mode of playback operation among a first mode of operation later called "interactive" for signalling it is configured for a synchronous playback and a second mode of operation later called "non interactive" in which playback operations are similar to the playback operations performed on basic terminals.

An advantage of the invention is then to be adapted for delivering content to all categories of terminals.

By "content", it is meant an audio/video program dedicated to continuous playback at constant speed, e.g. a soccer match or a TV quiz. The program can be pre-recorded and distributed at a particular time or it can be live.

Figure 2B:
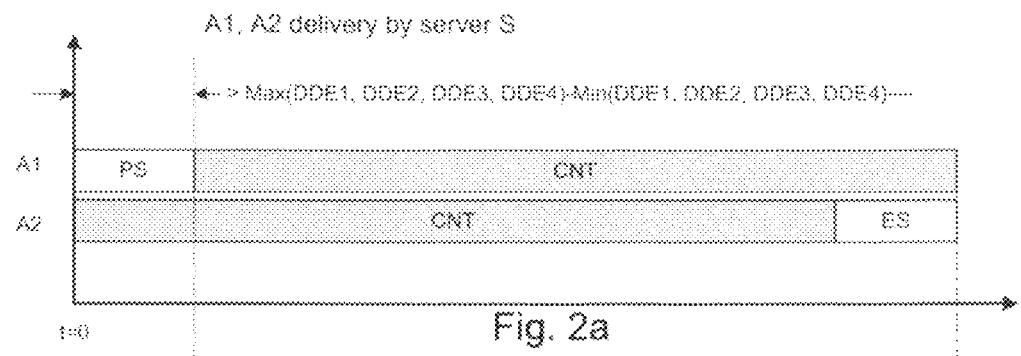
FIG. 2b illustrates effects of the different data delivery duration on arrival time of the first and second association at the terminals T1, T2, T3, T4.
Figure 2B:
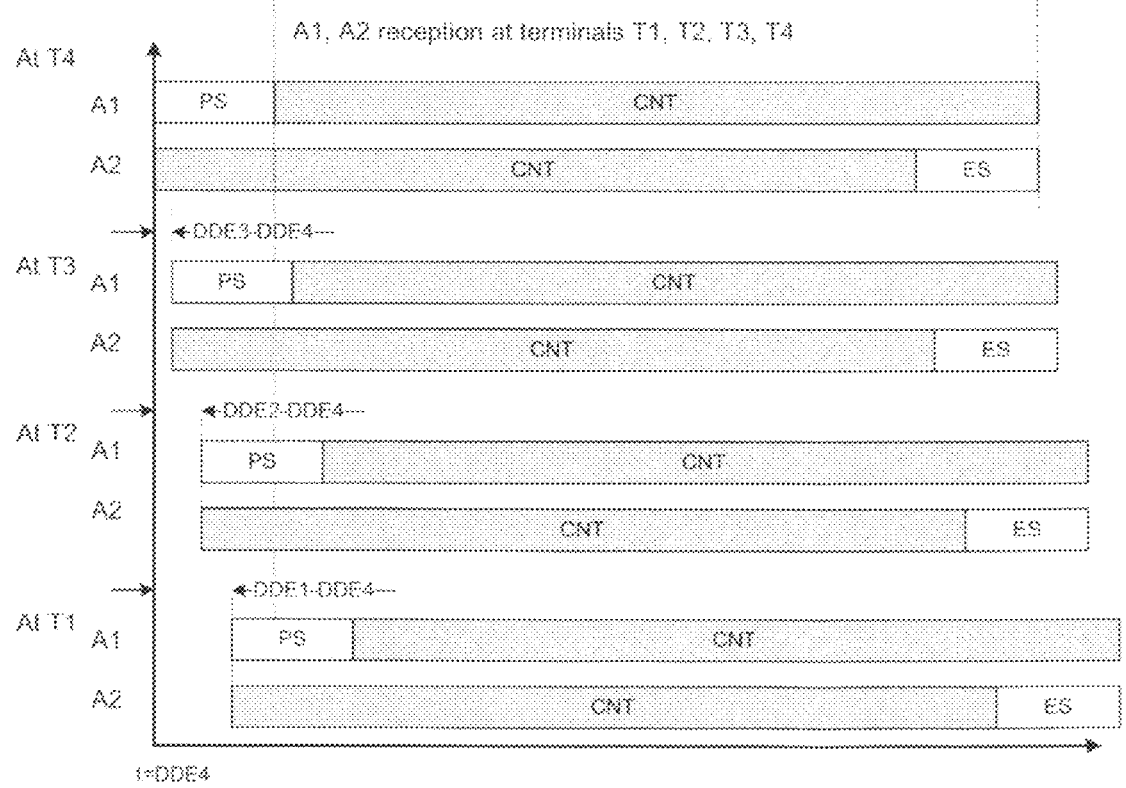

As shown on FIG. 2, the broadcaster associates into a first association A1 a content CNT to a preamble sequence PS. Both the content CNT and the preamble sequence PS are adapted for being played back by any terminal. The first association A1 is adapted for being played back by a terminal operating according to said non-interactive mode (or by any basic terminal). That means the association A1 playback starts immediately after the terminal starts to receive said first association A1.

Said preamble sequence PS is temporally positioned in said first association such that the terminal receiving said first association plays-back said preamble sequence PS entirely before said content. As soon as the playback of the preamble sequence PS ends, the content playback starts. The content playback is delayed by the playback duration of the preamble sequence PS as shown on FIG. 2b.

The broadcaster assigns to the preamble sequence PS a playback duration greater than or equal to the largest difference between all the data delivery durations over the available delivery networks. Said preamble sequence is prepared by the broadcaster.

By "preamble sequence", it is meant an audio/video program dedicated to a continuous playback at constant speed, partially or in totality for delaying the content playback. The audio/video program of the preamble sequence PS is pre-recorded. The preamble sequence PS can include data or metadata related to the associated content CNT, for example a title of said content, credits of said contents, still images, bonus etc.

In another embodiment, the preamble sequence PS can include advertisement messages.

As shown on FIG. 2a, the broadcaster further associates into a second association A2 said content CNT to an ending sequence ES also adapted for being played back by a terminal.

Said ending sequence ES is temporally positioned in said second association A2 such that the terminal receiving said second association plays-back said content CNT before said ending sequence ES. The second association A2 is adapted for being played back exclusively by a terminal operating according to said interactive mode.

Advantageously, the playback duration of the ending sequence ES is equal to the playback duration of the preamble sequence PS for facilitating the task of the broadcaster who has to deliver the first and the second association into a single transport stream.

At the server S, the broadcaster stores estimations DDE1, DDE2, DDE3, DDE4 of data delivery duration from the server S to each of the terminals T1, T2, T3, T4 respectively over said networks N1, N2, N3, N4. For example, these estimations are supplied by content diffusers.

The broadcaster further inserts said estimations DDE1, DDE2, DDE3, DDE4 in at least one of said first and second association A1, A2 and delivers second association A2 essentially simultaneously to terminals T1, T2, T3, T4 via the networks N1, N2, N3, N4. These insertions can be made as an auxiliary stream that means the insertions are periodically temporally repeated into said at least one of said first and second association A1, A2. This could, by example allow to update said estimations when the content diffusers supplies such estimation updates.

Figure 4:
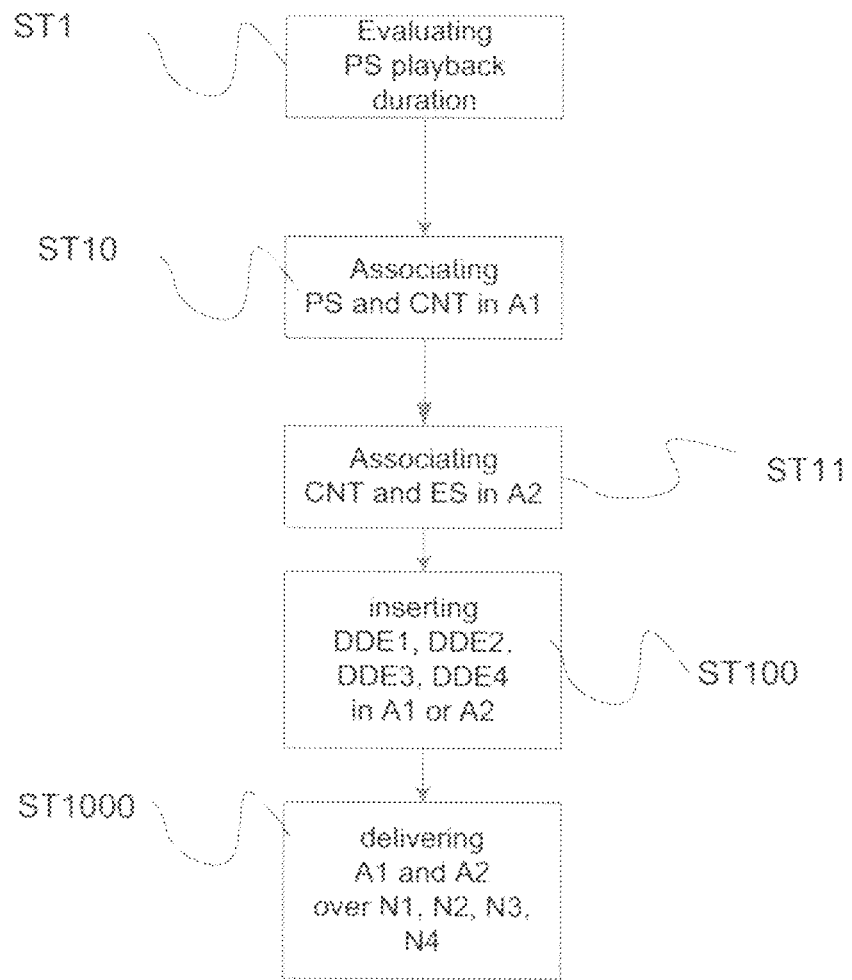
FIG. 4, represents a flow chart of a method for delivering a content to terminals for synchronous playbacks of said content onto said terminals, according to an embodiments.

As a summary of the operations performed at the server S by the broadcaster, FIG. 4 shows the main steps of the method for delivering content to at least two terminals T1, T2, T3, T4 for synchronous playbacks of said content onto said terminals according to said embodiment.

Step ST1 consists in evaluating a playback duration of a preamble sequence PS, wherein said playback duration is determined for being greater than or equal to the largest difference between said estimations DDE1, DDE2, DDE3, DDE4. The preamble sequence PS is adapted for being played back by said terminals T1, T2, T3, T4; This step can be avoided by assigning to the preamble sequence PS a duration which is empirically greater than all estimation of delivery duration: for example the preamble sequence PS playback duration is set to 30 seconds.

Step ST10 consists in associating into a first association A1 said content CNT to said preamble sequence PS. The preamble sequence PS is temporally positioned in said first association A1 such that a terminal T1, T2, T3, T4 playing back said first association A1 will plays-back successively entirely said preamble sequence PS and continuously said content;

Step ST11 consists in associating into a second association A2 said content CNT to an ending sequence ES. The ending sequence ES has a playback duration for example identical to the playback duration of the preamble sequence PS and is temporally positioned in said second association A2 such that a terminal playing back said second association A2 will playback said content CNT before said ending sequence ES.

Step ST100 consists in inserting said estimations DDE1, DDE2, DDE3, DDE4 at least one of said first and second association A1, A2.

Advantageously, step ST100 involves a step of inserting ST100 an arbitrary duration value τ in said at least one of said first and second association A1, A2.

The interest of said arbitrary duration value τ will be explained below.

Step ST1000 consists in delivering said first and second association A1 A2 to said terminals T1, T2, T3, T4 via said at least one network N1, N2, N3, N4. This delivery is essentially simultaneous.

Advantageously, said first and second association A1, A2 are delivered to a specific terminal T1, T2, T3, T4 through a single network N1, N1, N3, N4.

Advantageously, said first and second association A1, A2 are delivered to a specific terminal T3 through two different networks N3, N5. (N5 is not shown on FIG. 1). According to a variant, the terminal operating in interactive mode comprises two network interfaces respectively DVT-T interface and IP interface. Thus such a terminal receives the first association through DVB-T network while it receives the second association through IPTV network. The reception through IPTV network is almost synchronous to end terminals, since the bandwidth on the network is reserved for data delivery at least from the server to the latest node before the end terminal. According to another variant, a basic terminal operating in non-interactive mode only comprises one network interface and only receives the first association with the preamble sequence. Thus both associations are not necessarily delivered to all terminals: terminals operating in interactive mode receives the first and second association while basic terminals may only receive the first association to playback a delayed content by the preamble duration.

The signal structure comprising a first and second association A1, A2 is transparent for any head-end device VHE1, VHE2, VHE2, VHE4 which is usually adapted for formatting any data incoming on the associated network it is connected to. No adaptation is needed for addressing the content CNT to basic terminals either to terminals adapted for operating in interactive mode.

On FIG. 2b, one depicts the variability of data delivery duration which generates variability in the arrival time of the data at terminals T1, T2, T3, T4. In the representation of FIG. 2b, the x-axis represents the time and the origin is set at time DDE4 by considering the first and second associations A1, A2 are sent at date t=0. One will state that the data delivery duration from the server S to the terminal Ti is longer than the data delivery duration from the server S to the terminal Ti+1 where i is an index comprised between 1 and 4. In other words, if estimations of data delivery duration from server S to terminals Ti, is respectively named DDEi, one would have DDE1>DDE2>DDE3>DDE4.

Then, it is clear from FIG. 2b that the first and second association A1, A2 are received by the terminal T4 at a date DDE4, the first and second association A1, A2 are received by the terminal T3 with a data delivery delay to said reception corresponding to DDE3-DDE4.

Figure 3A:
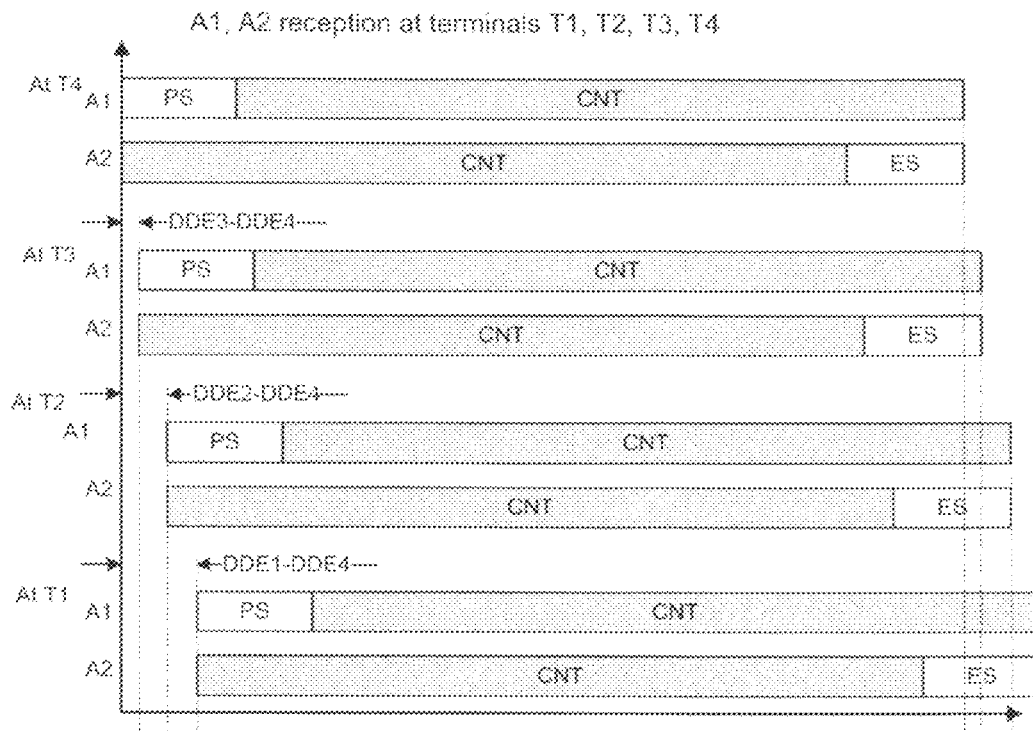
FIG. 3a illustrates also the arrival time of the first and second association at the terminals T1, T2, T3, T4.
Figure 3B:
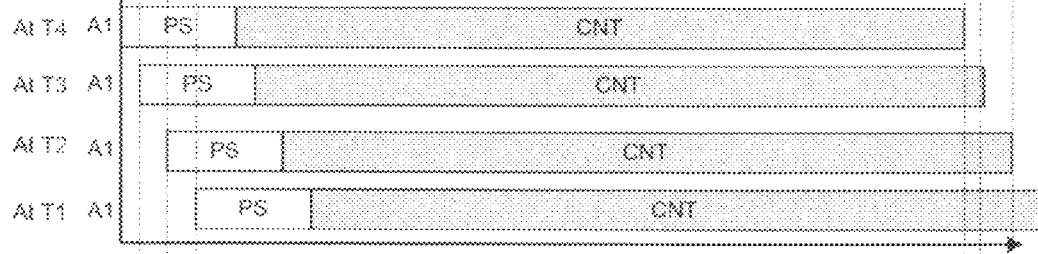
FIG. 3b illustrates in a temporal diagram how said first associations are played back at terminals T1, T2, T3, T4 when said terminals operate in a so-called "non-interactive mode"

One will present the playback operations at basic terminals or at terminals operating in said "non-interactive mode" from the temporal representation shown on FIG. 3b.

For the sake of clarity playback operations (synchronous and not synchronous) are shown in view with FIG. 3a which represents the various arrival times of the first and second association A1, A2 at terminals. FIG. 3a is similar to FIG. 3a.

The basic terminals or the terminals operating in a non-interactive mode start the data playback as soon as they receive the data. Whatever over which network N1, N2, N3, N4 the basic terminal is connected to the server S; the terminal has to playback the whole preamble sequence before playing the content. Then, in any case the playback of content CNT can start at the earliest after the end of the play-back of the preamble sequence PS: at least DDE1-DDE4 after terminal T4 the first association A1 reception start.

Figure 3C:
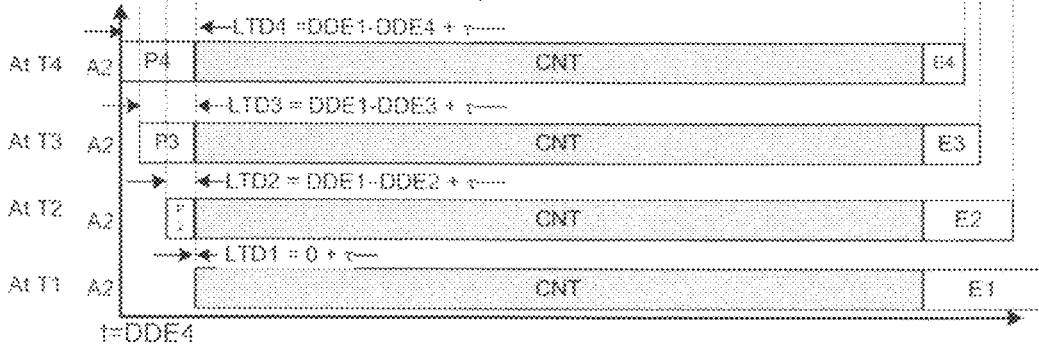
FIG. 3c illustrates in a temporal diagram how said second associations are played back at terminals T1, T2, T3, T4 when said terminals operate in a so-called "interactive mode"

One will now present the operations at terminals operating in the so-called interactive mode from the temporal representation shown on FIG. 3c.

As recalled above, the first and second association A1, A2 arrives with various delays on terminals. For getting a synchronous content playback on all terminals, one has to start the playback on all terminals at a date which is later than the latest reception of the first and second association A1, A2. It is advantageous that this playback start happens also before the start of quickest playback start in non-synchronous mode for advantaging the owner of terminals adapted for operating in interactive mode. In doing so the owner of terminals adapted for operating in interactive mode will mandatorily watch the content played back on its terminal shortly before any owner of a basic terminal.

In the example shown on FIG. 3c, the playback of the second association A2, then the content playback, is delayed with a local temporization duration LTD4 equal to DDE1-DDE4+τ. Where τ is an arbitrary duration value also inserted in the second association A2. For the sake of clarity τ is set to 0 on FIG. 3c.

Figure 1:
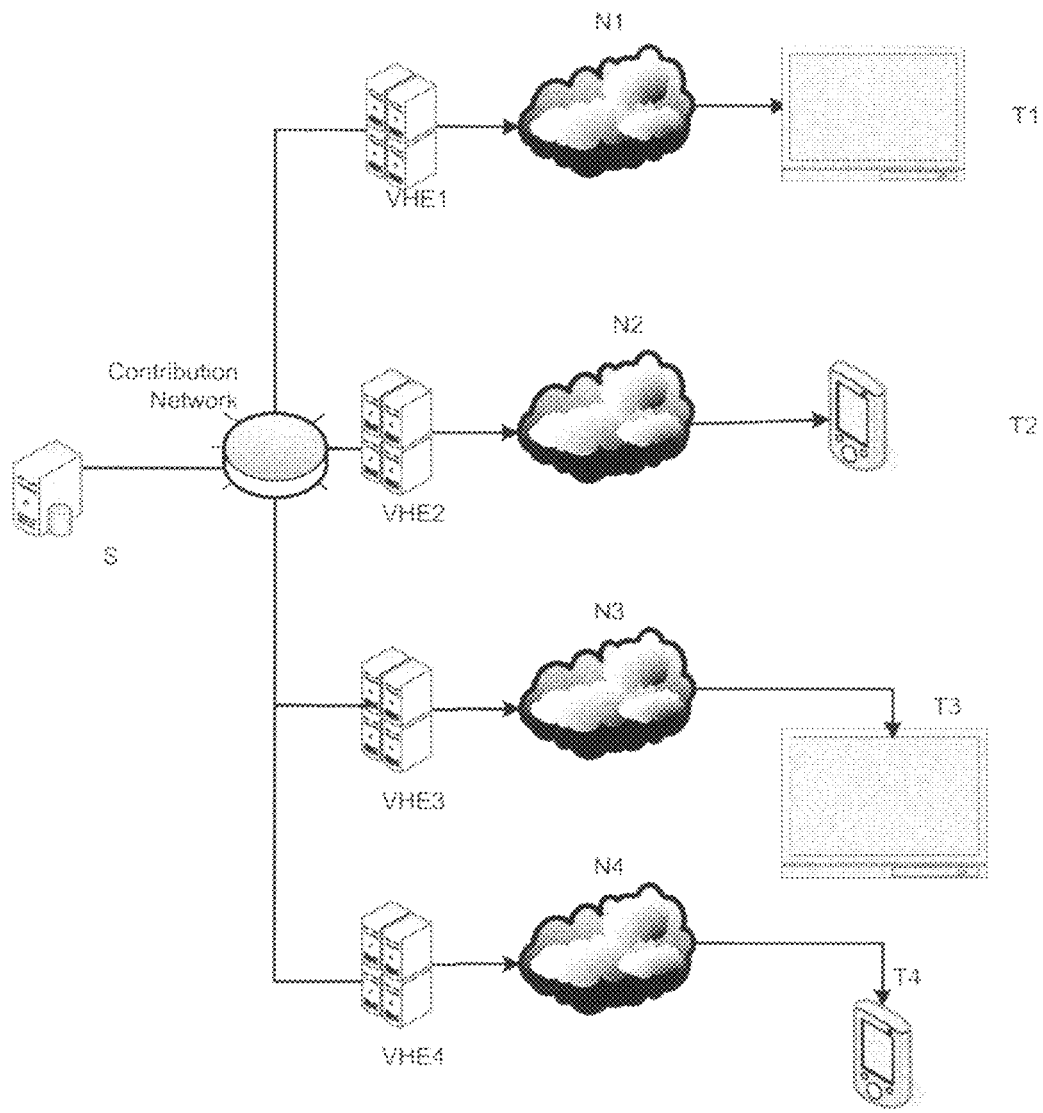
FIG. 1 represents a system for delivering of a content to four terminals connected over four different network pipes, this figure is described above.

Said arbitrary duration value τ represents a margin for handling a situation where a terminal T0 connected over a network N0 to the server S has a data delivery duration DDE0 greater than DDE1 (T0 and N0 are not represented on FIG. 1). In this particular case, the arbitrary duration value τ is adapted for delivering the first and second association to the terminals T0, T1, T2, T3, T4 without modifying the first and second association A1, A2 build when the broadcaster didn't know this slow network N0.

Advantageously, during said local temporization, the terminal plays-back a part of the preamble sequence PS received through the first association A1.

As shown on FIG. 3c, terminal T4 receives first the preamble sequence PS at date DDE4. Here, terminal T4 plays-back the whole preamble sequence PS as an introductory temporization program P4 as soon as it receives the preamble sequence PS through the first association A1.

Terminals T3, T2, T1 playback a part of the preamble sequence PS as an introductory temporization program P3, P2, P1 as soon as they receive it through the first association A1. The duration of said introductory temporization program P4, P3, P2, P1 is adapted such that the content playback starts respectively at a duration LTD4, LTD3, LTD2, LTD1 after the start of first and second association A1, A2 reception by the terminal T4, T3, T2, T1. Where LTD4=DDE1-DDE4+τ, LTD3=DDE1-DDE3+τ, LTD2=DDE1-DDE2+τ, LTD1=τ.

Figure 5:
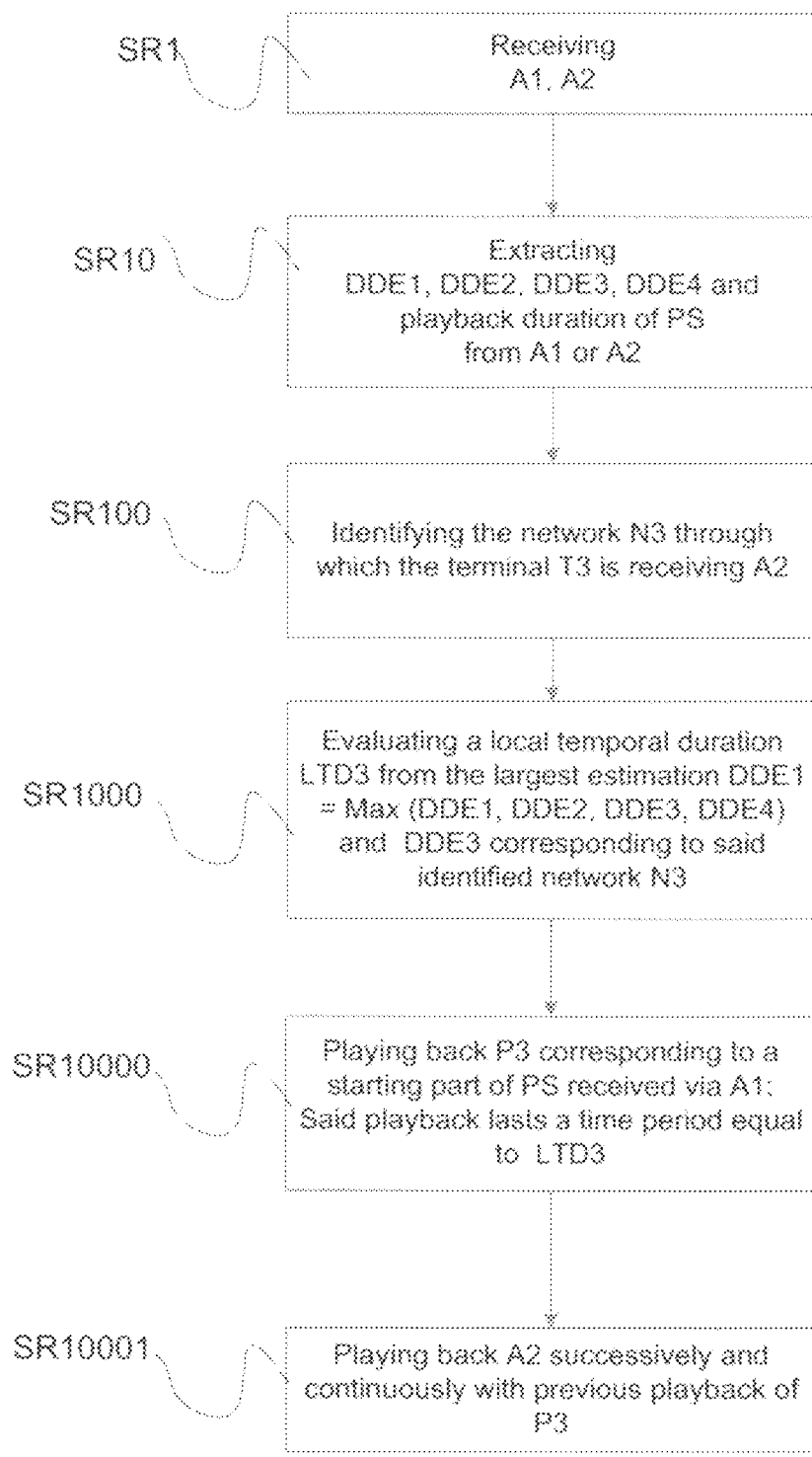
FIG. 5, represents a flow chart of the method for playing-back synchronously a content on terminals.

As an exemplary summary of the playback operations performed at terminals, FIG. 5 shows the main steps of the method for playing-back a content in a interactive mode by the terminal T3 connected over the network N3 when the content is delivered according to the embodiment of the method for delivering presented above:

Step SR1 consists in receiving said first and second association A1, A2 by said terminal T3 via said network N3;

Step SR10 consists in extracting the estimations DDE1, DDE2, DDE3, DDE4; of data delivery duration from the server S to each of the terminals T1, T2, T3, T4 over said networks N1, N2, N3, N4 and the preamble sequence playback duration.

Step SR100 consists in identifying the network N3 through which said terminal T3 is receiving said first and second association A1, A2;

Step SR1000 consists in evaluating a local temporization duration LTD3, from the largest estimation DDE1 and the estimation DDE3 corresponding to said identified network N3;

As disclosed above LTD3 is for example expressed as LTD3=DDE1−DDE3+τ.

Step SR10000 consists in starting a playback of an introductory temporization program P3 as soon as the first and second association A1, A2 are received. This playback duration is equal to LTD3.

Said introductory temporization program P3 corresponds to the starting part of the preamble sequence PS received via the first association A1.

As shown on FIG. 3 the durations of the introductory temporization program P1, P2, P3, P4 are all different on the terminals connected over different networks and can be null (cf. the duration of introductory temporization program P1 on the terminal T1).

The introductory temporization program P3 playback is followed by the second association A2 playback which comprises successively the content CNT and the ending sequence ES.

Step SR10001 consists in interrupting the second association playback when the whole playback duration is equal to the duration of the content playback plus the preamble sequence playback duration.

An ending temporization program E3 is played-back during the remaining time for reaching the duration of the content playback plus the preamble sequence playback duration.

Said ending temporization program E1, E2, E3, E4 corresponds to the starting part of the ending sequence ES received via the second association A2. As shown on FIG. 3 the durations of the ending temporization program E1, E2, E3, E4 are all different and can be equal to the plus the ending sequence playback duration (cf. the duration of ending temporization program E1 on the terminal T1).

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

What is claimed is:

1. A method for delivering a content to at least two terminals for synchronous playback of said content onto said at least two terminals, each of said at least two terminals being connected over a server through at least one network, wherein, at said server, the method comprises:

providing a first association of said content to a preamble sequence, said preamble sequence being temporally positioned in said first association such that a terminal playing back said first association plays-back successively and continuously said preamble sequence and said content;

providing a second association of said content to an ending sequence, said ending sequence being temporally positioned in said second association such that a terminal playing back said second association plays-back successively and continuously said content and said ending sequence;

providing estimations of data delivery duration from said server to each of the at least two terminals via said at least one network, and a playback duration of said preamble sequence in at least one of said first and second association, delivering said first association and second association simultaneously to each of said at least two terminals operating in a second mode of operation via a single respective network among said at least one network, wherein said playback duration of the preamble sequence is greater than or equal to the largest difference between said estimations, wherein said estimations of data delivery duration allows each of said at least two terminals operating according to said second mode of operation to playback said preamble sequence provided by said first association during a local temporization duration and then play back said content provided by said second association for synchronously playing-back said content by said at least two terminals operating according to said second mode of operation;

delivering said first association to each of said at least two terminals operating in a first mode of operation via said at least one network wherein a whole of the first association is played back by each of said at least two terminals operating according to said first mode of operation.

2. The method according to claim 1, wherein said preamble sequence and said ending sequence have an identical playback duration.

3. The method according to claim 1, wherein said preamble sequence, said ending sequence and said content are audio programs or programs combining audio and video.

4. The method according to claim 1, further comprising inserting an arbitrary duration value in said at least one of said first and second association.

5. A method for playing-back a content by a terminal of at least two terminals synchronously with other terminals of the at least two terminals connected over at least one network to a server delivering said content, wherein a first association gathers a preamble sequence and said content, said preamble sequence being temporally positioned in said first association such that when said terminal plays back said first association, said terminal plays-back successively and continuously said preamble sequence and said content, wherein a second association gathers said content and an ending sequence, said ending sequence being temporally positioned in said second association such that when said terminal plays back said second association, said terminal plays-back successively and continuously said content and said ending sequence, wherein one of said first or second association further comprises estimations of data delivery duration from said server to each of the at least two terminals via said at least one network and a playback duration of said preamble sequence, wherein at said terminal operating in a first mode of operation, the method further comprises:
receiving said first association via said at least one network;
playing-back successively and continuously said preamble and said content provided by said first association;
and wherein, at said terminal operating in a second mode of operation, the method further comprises:
receiving said first and second associations simultaneously from said server via a single respective network among said at least one network, said first and second association being provided to each of the at least two terminals operating according to said second mode;
extracting said preamble sequence playback duration and said estimations from said one of said first or second association;
identifying said single respective network through which said terminal is receiving said first and said second associations;
evaluating a local temporization duration from a largest estimation and the estimation corresponding to said identified single respective network;
playing-back the preamble sequence received via said first association during said local temporization duration, said playing-back starts at a reception date of said first and second associations; and
playing-back successively and continuously said content received via said second association.

6. The method according to claim 5, wherein said extracting further includes extracting from said one of said first or second association an arbitrary duration value, and wherein said evaluating a local temporization duration includes assigning to the local temporization duration a value equal to a sum of said arbitrary value with a difference between the largest estimation and the estimation.

7. The method according to claim 5, wherein said playing back said second association ends at an end of a time period whose duration is equal to a content playback duration plus the preamble sequence playback duration minus said local temporization duration.

8. Terminal for playing back a content synchronously with at least one other terminal connected over at least one network to a server, said terminal comprising at least one network interface and a processor, wherein said at least one network interface receives said content from the server, a first association gathering a preamble sequence and said content both adapted for being played-back by said processor of said terminal, said preamble sequence being temporally positioned in said first association such that said processor of said terminal plays back successively and continuously said preamble sequence and said content, a second association gathering said content and an ending sequence adapted for being played-back, said ending sequence being temporally positioned in said second association such that said processor of said terminal plays-back successively and continuously said content and said ending sequence, and wherein one of said first and second associations further comprises estimations of data delivery duration from said server to the terminal and at least one other terminal via the at least one network and a preamble sequence playback duration allowing said processor of said terminal to evaluate a local temporization duration for playing-back said content synchronously with the other terminals
wherein said processor is configured for operating according to a first mode of operation in which said processor receives said first association via at least one network;
plays back successively and continuously said preamble and said content provided by said first association upon receipt of said first association;
wherein said processor is configured for operating according to a second mode of operation in which said processor:
receives said first and second association simultaneously from said server via a single respective network among said at least one network, said first and second associations being provided to each of the at least two terminals operating according to said second mode;
extracts the preamble sequence playback duration and said estimations from said one of said first and second associations;
identifies the single respective network through which said terminal is receiving said first and second associations;
evaluates a local temporization duration being the difference between a largest estimation and the estimation corresponding to said identified single respective network;
plays back the preamble sequence received via said first association during said local temporization duration, said play-back starts at a reception date of said first and second associations; and
plays-back successively and continuously said content received via said second association.

9. The terminal according to claim 8, wherein, in the second mode of operation, said processor interrupts playing back said second association at a date corresponding to said starting reception date plus the content playback duration plus the preamble sequence playback duration minus said local temporization duration.

10. A server for delivering a content to at least two terminals for synchronous playback of said content onto said at least two terminals, each of the at least two terminals being connected to the server through at least one network, wherein, said server comprises at least one network interface for connecting to the at least two terminals; and a processor, said processor
provides a first association of said content to a preamble sequence, said preamble sequence being temporally positioned in said first association such that a terminal playing back said first association plays-back successively and continuously said preamble sequence and said content;
provides a second association of said content to an ending sequence, said ending sequence being temporally positioned in said second association such that a terminal playing back said second association plays-back successively and continuously said content and said ending sequence;
provides estimations of data delivery duration from said server to each of the at least two terminals via said at least one network, and a playback duration of said preamble sequence in at least one of said first and second association; and
delivers said first association and second association simultaneously to each of said at least two terminals operating in a second mode of operation via a single respective network among said at least one network wherein said playback duration of the preamble sequence is greater than or equal to a largest difference between said estimations, and wherein said estimations of data delivery duration allows each of said at least two terminals operating according to said second mode of operation to playback said preamble sequence provided by said first association during a local temporization duration then play back said content provided by said second association for synchronously playing-back said content by said at least two terminals operating according to a second mode of operation, and delivers said first association to each of said at least two terminals operating in a first mode of operation via said at least one network wherein a whole of said first association is played back by each of said at least two terminals operating according to said first mode of operation.

11. The server according to claim 10, wherein said preamble sequence and said ending sequence provided by said processor have an identical playback duration.

12. The server according to claim 10, wherein said preamble sequence, said ending sequence and said content provided by said processor are audio programs or programs combining audio and video.

13. The server according to claim 10, wherein said processor inserts an arbitrary duration value in said at least one of said first and second associations.

* * * * *